(12) United States Patent
Komuniecki et al.

(10) Patent No.: US 9,567,203 B2
(45) Date of Patent: Feb. 14, 2017

(54) APPARATUS AND METHOD FOR A PORTABLE FUEL SUPPLY FOR A VEHICLE

(71) Applicant: Westport Power Inc., Vancouver (CA)

(72) Inventors: Konrad J. Komuniecki, North Vancouver (CA); Gage Garner, Vancouver (CA)

(73) Assignee: WESTPORT POWER INC., Vancouver (CA)

( * ) Notice: Subject to any disclaimer, the term of this patent is extended or adjusted under 35 U.S.C. 154(b) by 360 days.

(21) Appl. No.: 14/272,472

(22) Filed: May 7, 2014

(65) Prior Publication Data

US 2014/0238529 A1 Aug. 28, 2014

Related U.S. Application Data

(63) Continuation of application No. PCT/CA2012/050841, filed on Nov. 22, 2012.

(30) Foreign Application Priority Data

Nov. 24, 2011 (CA) ..................................... 2759349

(51) Int. Cl.
*B65B 37/00* (2006.01)
*B67D 7/38* (2010.01)
(Continued)

(52) U.S. Cl.
CPC ................ *B67D 7/38* (2013.01); *B60K 15/07* (2013.01); *B67D 7/84* (2013.01);
(Continued)

(58) Field of Classification Search
CPC .................... B67D 7/845; B60K 15/07; B60K 2015/03157; B60K 2015/03184; B60Y 2200/146
(Continued)

(56) References Cited

U.S. PATENT DOCUMENTS

| 1,976,985 A | 10/1934 | Davis |
| 2,777,606 A | 1/1957 | Moore et al. |

(Continued)

FOREIGN PATENT DOCUMENTS

| CA | 2457641 A1 | 9/2004 |
| CN | 201391743 Y | 1/2010 |

(Continued)

OTHER PUBLICATIONS

International Search Report and Written Opinion of the International Searching Authority issued on Feb. 6, 2013, in connection with International Application No. PCT/CA2012/050841.
(Continued)

*Primary Examiner* — Jason K Niesz
(74) *Attorney, Agent, or Firm* — Carie Mager; C. L. Kyle

(57) ABSTRACT

An improved apparatus and method provide a portable fuel supply for a vehicle. The apparatus comprises a vessel that is a source of fuel and a conduit that is operatively connected with the vessel at one end. There is also a coupling pin arrangement connected with the vessel. The coupling pin arrangement comprises a coupling pin and is mutually engageable with a fifth wheel coupling device. An end opposite the one end of the conduit operatively connects with a fuel system of the vehicle such that the vessel is in fluid communication with the fuel system and the vehicle operates with the fuel from the vessel.

28 Claims, 4 Drawing Sheets

(51) Int. Cl.
  *B60K 15/07* (2006.01)
  *B67D 7/84* (2010.01)
  *B60K 15/03* (2006.01)

(52) U.S. Cl.
  CPC ............... *B60K 2015/03157* (2013.01); *B60K 2015/03184* (2013.01); *B60Y 2200/148* (2013.01); *B67D 7/845* (2013.01)

(58) Field of Classification Search
  USPC ........................................................ 141/231
  See application file for complete search history.

(56) References Cited

U.S. PATENT DOCUMENTS

| | | |
|---|---|---|
| 3,677,284 A | 7/1972 | Mendez |
| 3,753,506 A | 8/1973 | Palmer et al. |
| 4,449,724 A | 5/1984 | Ahn |
| 4,940,256 A | 7/1990 | Jordan, III |
| 6,019,565 A | 2/2000 | Gesuale |
| 6,224,103 B1 | 5/2001 | Hatcher |
| 7,452,027 B2 | 11/2008 | Hensler et al. |
| 2004/0178204 A1 | 9/2004 | Spenceley et al. |
| 2007/0170180 A1* | 7/2007 | Watanabe ............. B60K 15/07 220/4.12 |

FOREIGN PATENT DOCUMENTS

| | | |
|---|---|---|
| CN | 102050089 A | 5/2011 |
| WO | 2010132809 A1 | 11/2010 |

OTHER PUBLICATIONS

International Preliminary Report on Patentability and Written Opinion of the International Bureau issued on May 27, 2014, in connection with PCT/CA2012/050841.

Search Report issued by SIPO on Nov. 17, 2015 in connection with co-pending China Application No. 201280057175.5.

* cited by examiner

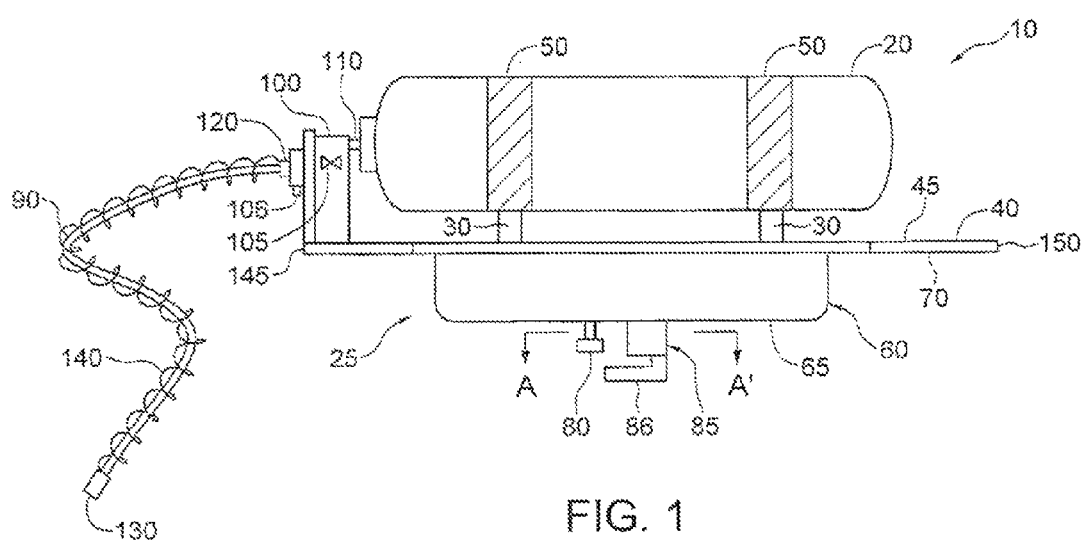

APPARATUS AND METHOD FOR A PORTABLE FUEL SUPPLY FOR A VEHICLE

CROSS-REFERENCE TO RELATED APPLICATIONS

This application is a continuation of International Application No. PCT/CA2012/050841 having an international filing date of Nov. 22, 2012 entitled "Apparatus And Method For A Portable Fuel Supply For A Vehicle". The '841 international application claimed priority benefits, in turn, from Canadian Patent Application No. 2,759,349 filed on Nov. 24, 2011. The '841 international application is hereby incorporated by reference herein in its entirety.

FIELD OF THE INVENTION

The present invention relates to a portable fuel supply for a vehicle. The portable fuel supply temporarily provides fuel for combustion to motor the vehicle to a fuelling station where a primary fuel supply can be replenished, or to motor the vehicle from the fuelling station after the primary fuel supply was purged. The portable fuel supply can also be employed as a secondary fuel supply to extend the range of the vehicle.

BACKGROUND OF THE INVENTION

Dealers of alternative fuel vehicles, and especially trucks motoring from fuels such as liquefied natural gas (LNG) or liquefied petroleum gas (LPG), conduct service on these vehicles when required to fulfill warranty obligations. In order to safely service the engine the fuel should be purged from the fuel system, which normally involves defueling by transferring to another tank or venting. Depending on the length of the repair or the amount of fuel available it may not be practical or possible to reuse the fuel as it evaporates over time. After servicing is completed the trucks must be refuelled (with LNG or LPG) before being returned to the operator. Service locations are normally not equipped with an LNG/LPG fuelling station due to the economic costs and operating license requirements associated with such a facility. Instead, dealers have employed a number of alternative strategies to refuel trucks after servicing.

In certain situations it is possible that LNG/LPG can be transferred from the fuel tank of the truck to a secondary storage vessel before servicing begins, and then after repairs are completed the LNG/LPG can be transferred back to the truck. This method requires specialized equipment to perform the transfer, and typically involves substantial venting and waste of fuel to the atmosphere. Another approach that obviates the need for specialized equipment involves transporting LNG/LPG to the service location such that the truck can be refuelled by a mobile refuelling facility. The operator of the mobile refuelling facility requires a permit to transport LNG/LPG fuel which increases the cost of repair. There is also an inconvenience associated with waiting for the mobile refuelling facility to arrive at the service location.

Another solution involves CNG or LNG cylinders that are strapped onto the truck in a temporary arrangement. The cylinder strap-on arrangements are typically in locations that do not comply with vehicle installation codes related to regulations governing fuel tanks. Cylinders containing LNG are most commonly employed in this regard, and using these cylinders results in excessive fuel wastage from venting to atmosphere. Due to the disadvantages associated with the above methods, trucks are normally refuelled by towing them to a fuelling station. This solution does not require licensing or permits, and does not involve expensive specialized equipment. However, the cost associated with towing can be considerable which increases the warranty cost to dealers that ultimately leads to greater costs for truck operators as well.

The present method and apparatus refuel a vehicle after servicing without significantly wasting fuel through venting and without incurring a significant economic cost.

SUMMARY OF THE INVENTION

An improved fuel apparatus is provided for a vehicle comprising a fuel system and a fifth wheel coupling device. The fuel apparatus comprises a vessel, a first conduit and a coupling pin arrangement. The vessel comprises a source of fuel. The first conduit is operatively connected with the vessel at one end. The coupling pin arrangement is connected with the vessel and comprises a coupling pin. The coupling pin arrangement is mutually engageable with the fifth wheel coupling device. An end opposite the one end of the first conduit operatively connects with the fuel system of the vehicle such that the vessel is in fluid communication with the fuel system and the vehicle operates with the fuel from the vessel. The fuel can be a liquid fuel, such as diesel, gasoline, ethanol, blends of ethanol and gasoline, or a gaseous fuel such as natural gas, methane, hydrogen or liquefied petroleum gas (LPG). When the fuel is natural gas it can be in the form of compressed natural gas (CNG) or liquefied natural gas (LNG). In a preferred embodiment the vessel can be a compressed gas cylinder. In another preferred embodiment the vessel and the coupling pin arrangement are integrated with each other. The first conduit can comprise a flexible hose that can further comprise a sheath wrapped around the hose for protection and strain prevention. The coupling pin arrangement comprises a rotation prevention member and a tilt prevention member. The coupling pin arrangement further comprises a platform comprising a top side and a bottom side. The vessel is secured to the top side and the coupling pin is connected with the bottom side. The fuel apparatus further comprises a manifold coupling that is supported by the platform. The manifold coupling comprises a valve. A second conduit connects the manifold coupling with the vessel. The first conduit connects the manifold coupling with the fuel system and the valve controls flow of the fuel between the first conduit and the second conduit. The fifth wheel coupling device comprises a first surface and the bottom side of the platform comprises a second surface. The first surface is substantially congruent to the second surface. The platform further comprises supports on the top side for supporting the vessel and straps fasten the vessel to the platform.

An improved method of fuelling a vehicle comprises securing a fuel supply with a fifth wheel coupling device of the vehicle; fluidly connecting the fuel supply with a fuelling system of the vehicle; and communicating fuel from the fuel supply to the fuel system for combustion in cylinders of the vehicle. In another manner of operation, instead of combusting fuel from the fuel supply in the cylinders of the vehicle, the fuel system on the vehicle delivers fuel to the fuel supply. The fuel supply can comprise a cylinder such that the method further comprises adapting the cylinder to engage the fifth wheel coupling device on the vehicle. When securing the fuel supply to the vehicle the method comprises preventing rotation and tilt of the fuel supply. The fuel supply can be supported on a support structure when not being used by the vehicle. The fuel supply can be replenished from a gas line, for example a commercial or residential gas line, or from a mobile refueling truck. A pressure increasing device can be employed to increase the pressure of gaseous fuel stored in the fuel supply when it is being replenished. The vehicle can be maneuvered into the support structure whereby the fifth wheel coupling device engages the fuel supply and the method further comprises driving the vehicle away from the support structure. The method further comprises maneuvering the vehicle with the fuel supply into the support structure; supporting the fuel supply with the support structure; disengaging the fuel supply from the fifth wheel coupling device; and driving the vehicle away from the support structure. In yet another manner of operation, the step of disengaging further comprises fluidly disconnecting the fuel supply from the fuelling system of the vehicle. In yet again another manner of operation, the method comprises fluidly disconnecting the fuel supply from the fuelling system of the vehicle before maneuvering the vehicle with the fuel supply into the support structure.

BRIEF DESCRIPTION OF THE DRAWINGS

FIG. 1 is a pictorial plan view of a portable fuel-supply apparatus according to a first embodiment.

FIG. 2 is a cross-sectional view of a coupling pin and a rotation and tilt prevention member of the portable fuel-supply apparatus of FIG. 1.

FIG. 3 is a pictorial plan view of the portable fuel-supply apparatus of FIG. 1 mounted on a fifth wheel coupling device of a truck.

DETAILED DESCRIPTION OF PREFERRED EMBODIMENT(S)

Figure 4:
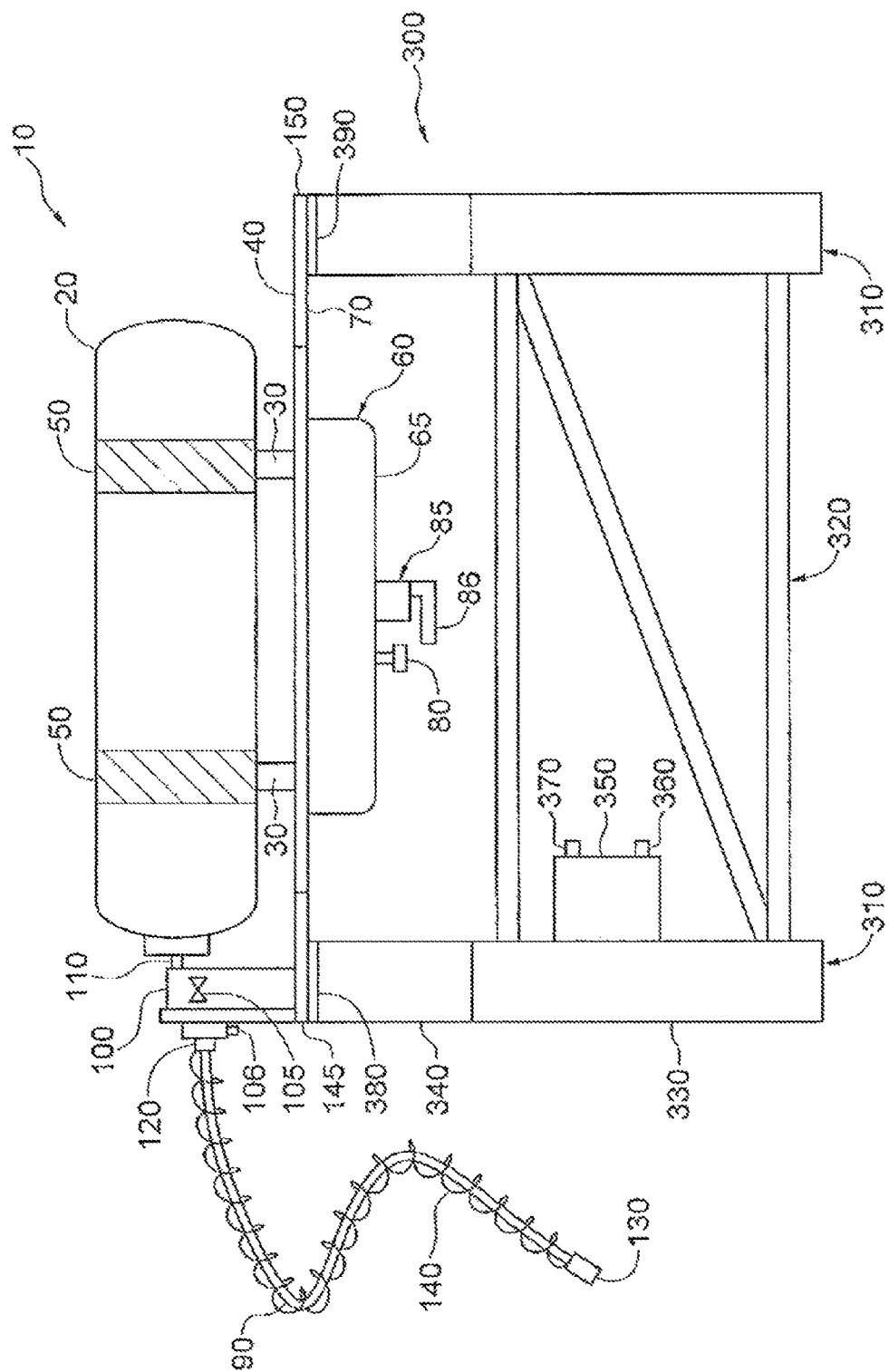
FIG. 4 is a pictorial plan view of the portable fuel-supply apparatus of FIG. 1 mounted on a support structure.

Referring to the drawings and first to the illustrated embodiment of FIG. 1 there is shown a portable fuel-supply apparatus indicated generally by reference numeral 10. Portable fuel-supply apparatus 10 comprises a fuel supply in the form of a vessel containing a fuel. In the present embodiment the vessel comprises cylinders 20, and more particularly there are three cylinders 20 each of which has a 70 liter capacity. In other examples there can be fewer or more cylinders 20 of varying capacity. The selection of the number and capacity of cylinders is dependent upon the fuelling range required. Cylinders 20 are gas cylinders that contain a gaseous fuel, for example compressed natural gas, but it is possible for cylinders 20 to comprise other fuels that can fuel truck 200 in FIG. 3. A gaseous fuel is defined herein to be any fuel that is in a gaseous phase at room temperature (20° C.) and standard pressure (1 atmosphere). Although the present apparatus and method will be discussed with respect to gaseous fuels, it is possible that portable fuel-supply apparatus 10 can provide a liquid fuel for a truck that can motor from liquid fuel.

With reference to both FIGS. 1 and 3, cylinders 20 are connected with a coupling pin arrangement generally indicated by reference numeral 25. Arrangement 25 adapts cylinders 20 to be mountable on fifth wheel coupling device 210 and comprises a platform 40 having top side 45 on which supports 30 are disposed. Cylinders 20 rest on supports 30 and are securely attached thereto by straps 50. Coupling pin arrangement 25 comprises a lower portion 60 on bottom side 70 of platform 40. Lower portion 60 comprises an outer surface 65 having a contour that is substantially congruent to a contour of outer surface 215 of fifth wheel coupling device 210 on truck 200. Coupling pin arrangement 25 further comprises coupling pin 80 that is connected with lower portion 60 and extends below and away from bottom side 70. Coupling pin 80 is mutually engageable with fifth wheel coupling device 210 of truck 200 in a secure manner such that portable fuel-supply apparatus 10 is securely attached to truck 200. Coupling pin 80 and coupling device 210 together form what is known as a fifth wheel coupling. Coupling pin 80 is also called a king-pin. Coupling device 210 is also called a fifth wheel and is typically horse-shoe shaped in form, although this is not a requirement for the present apparatus and method. A rotation and tilt prevention member 85 is connected with lower portion 60 and operates to inhibit or prevent rotation of portable fuel-supply apparatus 10 and tilt of coupling device 210 when they are securely engaged with each other. A tilt prevent portion 86 extends outwardly from a bottom side of member 85 and engages a lateral support, for fifth wheel coupling device 210, extending between frame rails 230 on truck 200, such that tilting of apparatus 10 and coupling device 210 while securely engaged with each other is prevented. As seen in FIG. 2, member 85 has sloped surfaces 87 and 88 that mutually engage corresponding surfaces on coupling device 210 and inhibit or prevent rotation of apparatus 10. In other embodiments rotation and tilt prevention member 85 can be two or more separate components on apparatus 10 that perform rotation prevention and tilt prevention separately or in cooperation, and can comprise structural or mechanistic components to accomplish rotation and tilt prevention. Conventional coupling devices are spring loaded and when for example a trailer engages such a conventional coupling device it tilts towards the horizontal. Portable fuel supply apparatus 10 can level coupling device 210, as seen in FIG. 3, or can be secured at an angle to the horizontal. In both situations rotation and tilt prevention member 85 prevents coupling device 210 from tilting and apparatus 10 from rotating when they are securely engaged with each other. In another embodiment, portable fuel-supply apparatus 10 comprises an integrated vessel that comprises coupling pin 80 and rotation and tilt prevention member 85 integrated with the fuel supply of apparatus 10 such that a bottom side of the integrated vessel is mutually engageable with the fifth wheel coupling device. In this situation. In this situation the fuel supply can be a conformable tank with a shape other than that of a cylinder.

Portable fuel-supply apparatus 10 further comprises manifold coupling 100 that fluidly connects with cylinders 20 through conduit 110. In other embodiments, cylinders 20 can be connected directly with coupling 100. A conduit in the form of flexible hose 90 is fluidly connected with coupling 100 at end 120, best seen in FIG. 1, and with accumulator 220 at end 130, best seen in FIG. 3. Accumulator 220 is part of the fuel system of truck 200 that accumulates compressed natural gas. In alternative embodiments, hose 90 can connect with a conduit in the fuel system of truck 200 downstream from fuel tank 240. Hose 90 is in fluid communication with cylinders 20 by way of manifold coupling 100. Valve lever 106 controls the flow of fuel through valve 105 in coupling 100 between conduit 110 and hose 90. Fuel flows from cylinders 20 through conduit 110, coupling 100, valve 105 (when open) and hose 90 to accumulator 220 when truck 100 is operating. In other embodiments it is also possible to control valve 105 electrically, for example when valve 105 is a solenoid-type valve. Hose 90 is wrapped in armored sheath 140 in the present example in order to protect it from damage due to accidental contact causing strain.

Referring now to FIG. 4, portable fuel-supply apparatus 10 is supported by structure 300 when being stored at a service location, for example, while not being used by truck 200. Structure 300 comprises four telescoping support posts 310, two of which are shown in FIG. 4, and support lattice 320 therebetween. Each telescoping post 310 comprises bottom portions 330 and upper portions 340. Respective upper portions 340 can be individually telescopically adjusted with respect to corresponding bottom portions 330 by use of hydraulic, pneumatic, manual or other means, in order to adjust the vertical position of coupling pin 80 with respect to coupling device 210, as will be described in more detail below. Upper portions 340 are securely attached with platform 40 at bottom side 70 while portable fuel-supply apparatus 10 is being supported by structure 300.

Hose 90 can be connected with a commercial or residential gas line (not shown) in order to fill cylinders 20 while apparatus 10 is securely mounted on support structure 300. In other embodiments hose 90 can be connected with output 360 of gas compressor 350 shown mounted to structure 300 next to lower portion 330. Input 370 of compressor 350 is connected with the commercial or residential gas line. Compressor 350 can pressurize cylinders 20 to an operational pressure suitable for the fuel system of truck 200. It is also possible that a mobile fuel source transporting CNG could be used to fill cylinders 20, which can either fill cylinders 20 directly or through compressor 350.

Figure 5:
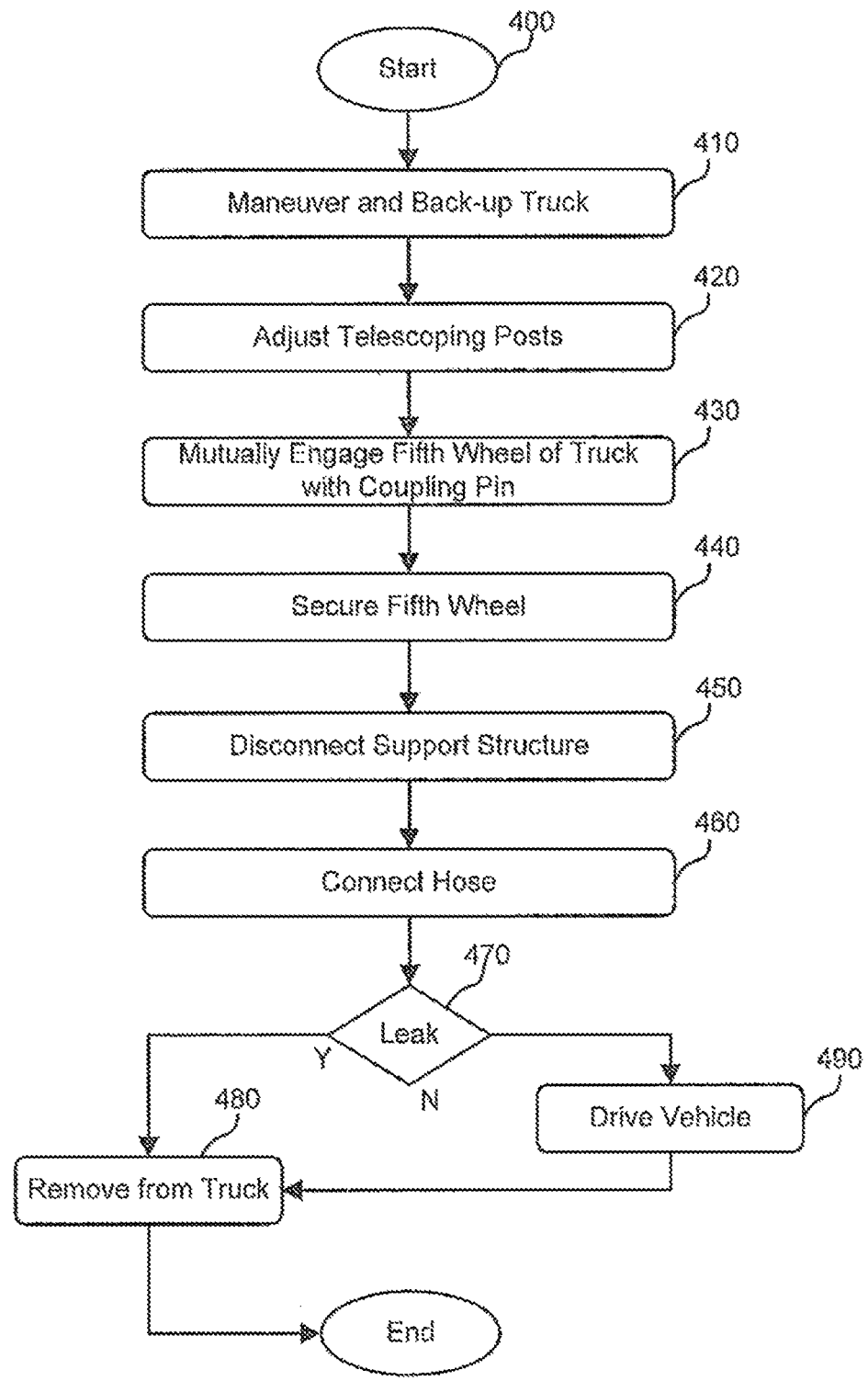
FIG. 5 is a flow chart for a method of securely mounting the portable fuel-supply apparatus of FIG. 1 to a truck.

Referring now to FIG. 5, the sequence of steps performed when mounting portable fuel-supply apparatus 10 to truck 200 is now described. In step 410, truck 200 is maneuvered into position so that it can back into structure 300 in order to engage apparatus 10. When truck 200 is positioned correctly the operator begins backing the truck into structure 300. In step 410, truck 200 can run on primary fuel, limp mode or be backed up by a third mode such as a forklift. As coupling device 210 of truck 200 nears coupling pin 80 of apparatus 10 the rearward progress of the truck is temporarily halted. The operator can adjust telescopic posts 310 in step 420, if required, so that coupling device 210 and coupling pin 80 are in vertical alignment making mutual engagement possible. All connections of truck 200 to the apparatus 300 are made in the same way and by the same method as a standard tractor fifth wheel attaches to a trailer. Normally all telescopic posts 310 are adjusted simultaneously upwards or downwards in order to effect vertical alignment, however in some situations it is possible to adjust respective posts 310 by varying or equal amounts in the same or different directions in order to bring coupling pin 80 into mutual correspondence with coupling device 210. After adjustment of telescopic posts 310 is completed, the operator continues the rearward progress of truck 200 in step 430 until coupling device 210 mutually engages coupling pin 80 and the outer surface of lower portion 60. Coupling device 210 is secured to apparatus 10 in step 440 by activating the fifth wheel locking mechanism onboard truck 200, and in step 450 apparatus 10 is disconnected from telescoping posts 310. If truck 200 is empty of primary fuel (LNG/LPG) then step 460 can be carried out. If truck 200 is not yet empty of primary fuel then end 130 of hose 90 can be secured and step 490 can be carried out next. Proceeding with step 460, hose 90 is connected with accumulator 220 in step 460. Valve 105 in coupling 100 and a valve (not shown) in accumulator 220 are opened in step 470 to allow gas from cylinders 20 to enter accumulator 220, at which point a leak check is performed to verify the integrity of hose 90 and the connections between end 120 of hose 90 with coupling 100 and end 130 with accumulator 220. If there is a leak the connections are checked and remade at each end 120 and 130 of hose 90 and if the leak remains the valve in coupling 100 is closed and portable fuel-supply apparatus 10 is removed from truck 200 in step 480, as will be described in more detail below. If no leak is found the operator of truck 200 can drive the vehicle in step 490 and a fuel gauge inside truck 200 indicates fuel available. An advantage of the present apparatus and method is that portable fuel-supply apparatus 10 is connected with truck 200 in a safe, secure and compliant manner according to regulations governing fuel tanks. This is unlike previous temporary strap on packs which were attached in a non-compliant fashion. After truck 200 begins fuelling from portable fuel-supply apparatus 10 it can be driven to an LNG/LPG fuelling station.

At the fuelling station, if the truck has not yet been serviced the primary fuel supply of truck 200 can be purged of LNG/LPG such that minimal fuel is vented to atmosphere, after which the truck can be driven back to the service location for maintenance. Note that before service begins portable fuel-supply apparatus 10 can be mounted on truck 200 and driven to the fuelling station on primary fuel and after primary fuel is purged hose 90 can be connected with accumulator 220. If truck 200 has completed servicing it can be refuelled with LNG/LPG and driven back to the service location, motoring either from primary fuel or from portable fuel-supply apparatus 10, and returned to its operator. If driven back to the service location on primary fuel than hose 90 can be disconnected from accumulator 220 as outlined below. It is also possible to motor from primary fuel while returning to the service location while simultaneously refuelling cylinders 20 with fuel from fuel tank 240 on truck 200. In this situation the fuel system on truck 200 would deliver pressurized fuel to cylinders 20 through accumulator 220.

Figure 6:
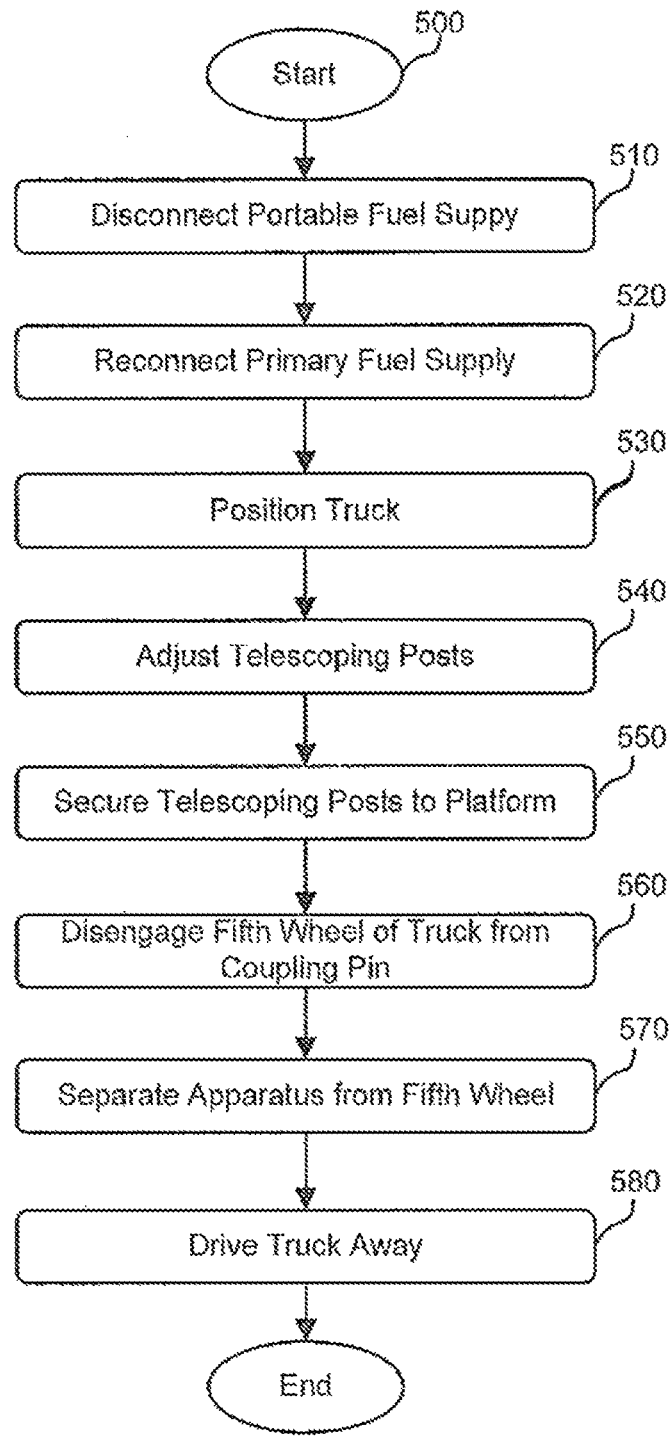
FIG. 6 is a flow chart for a method of securely dismounting the portable fuel-supply apparatus of FIG. 1 from the truck.

Portable fuel-supply apparatus 10 should be removed before truck 200 is returned to its operator. The procedure for removing portable fuel-supply apparatus 10 from truck 200 is now described with reference to FIG. 6. If truck 200 is motoring from portable fuel-supply apparatus 10 then steps 510 and 520 are carried out. If truck 200 is motoring from primary fuel (LNG/LPG) then steps 510 and 520 are skipped. In step 510 portable fuel-supply apparatus 10 is disconnected from the fuel system on board truck 200. Valve 105 in coupling 100 and the valve in accumulator 220 are closed which disconnects hose 90 from conduits 110 and cylinders 20, and from accumulator 220, thereby interrupting the flow of gaseous fuel. Another valve (not shown) in coupling 100 is opened which safely vents excess gas in hose 90 to atmosphere. End 130 of hose 90 is disconnected from accumulator 220 and after which hose 90 is secured to platform 40 of apparatus 10. The primary fuel supply of truck 200 is reconnected in step 520 so that truck 200 can motor from its primary fuel. In step 530, truck 200 is motored to structure 300 and maneuvered into position so that it can back-up into structure 300 in order to disengage apparatus 10. When truck 200 is positioned correctly the operator begins backing the truck into structure 300. As end portions 145 and 150 of platform 40 are positioned above retracted telescoping posts 310 the rearward progress of truck 200 is halted. The operator adjusts telescoping posts 310 in step 540 such that ends 380 and 390 of posts 310 come into contact with platform 40 at ends 145 and 150 respectively. Telescopic posts 310 are secured to platform 40 in step 550. Coupling device 210 is disengaged from coupling pin 80 of apparatus 10 in step 560 by activating the appropriate mechanisms onboard truck 200. In step 570 telescopic posts 310 are adjusted further upwards so that lower portion 60 rises above and separates from coupling device 210. Truck 200 is driven forward in step 580 out of and away from structure 300.

The apparatus and method of the illustrated embodiment reduces or minimizes towing expenses by allowing the dealer to use a temporary CNG fuel source to power an LNG truck in order to drive the truck to an LNG/LPG fuelling station. This significantly reduces the cost of repairs by allowing service locations to become self-sufficient and not reliant upon mobile LNG/LPG refuelling trucks or towing to get vehicles to fuelling stations. Portable fuel-supply apparatus 10 is secured to truck 200 in a safe and compliant manner according to regulations governing fuel tanks, unlike previous temporary solutions. This has the further advantage of allowing truck 200 to be operated on the highway. The vehicle can be operated normally, at highway speeds, without impacting the engine after treatment system, for example when truck 200 is in a Run-On-Diesel mode of operation. The disclosed method provides a safe, cost-effective and secure way to get trucks, whose primary fuel is LNG/LPG, to a fuelling station without the waste through venting while filling a downed truck by using non-station filling procedures.

Truck 200 can alternatively operate in high pressure or low pressure direct injection modes. Quite often LNG trucks operate using high pressure direct injection. When fuelling from portable fuel-supply apparatus 10 the fuel is directly fed to accumulator 220 at a pressure at most equal to the pressure in cylinders 20. As fuel from cylinders 20 is consumed by truck 200 the pressure in cylinders 20 will decrease. At some critical fuel pressure in cylinders 20 it will no longer be possible to perform high pressure direct injections. At this boundary condition it is possible to inject gaseous fuel earlier in the injection cycle so that a lower fuel injection pressure can be tolerated. Electronic control unit 250 in truck 200 can be programmed accordingly for the operating conditions described above.

In another preferred embodiment, portable fuel supply apparatus 10 can be employed in liquid fuel applications where a vehicle motors from one of diesel, gasoline, ethanol and blends of ethanol and gasoline. In these applications, end 130 of hose 90 connects with a liquid fuel system on board the vehicle, and the fuel supply vessel of apparatus 10 comprises the liquid fuel.

While particular elements, embodiments and applications of the present invention have been shown and described, it will be understood, that the invention is not limited thereto since modifications can be made by those skilled in the art without departing from the scope of the present disclosure, particularly in light of the foregoing teachings.

What is claimed is:

1. A fuel apparatus for a vehicle, said vehicle comprising a fuel system and a fifth wheel coupling device, said apparatus comprising:
   (a) a vessel comprising a source of fuel;
   (b) a first conduit operatively connected with said vessel at one end; and
   (c) a coupling pin arrangement connected with said vessel, said coupling pin arrangement comprising a coupling pin and being mutually engageable with said fifth wheel coupling device;
   wherein said fuel apparatus is primarily supported by said vehicle and an end opposite said one end of said first conduit operatively connects with said fuel system of said vehicle such that said vessel is in fluid communication with said fuel system and said vehicle operates with said fuel from said vessel.

2. The fuel apparatus of claim 1, wherein said fuel is a gaseous fuel.

3. The fuel apparatus of claim 2, wherein said gaseous fuel is selected from the group consisting of natural gas, methane, hydrogen, LNG and LPG.

4. The fuel apparatus of claim 1, wherein said fuel is a liquid fuel.

5. The fuel apparatus of claim 4, wherein said liquid fuel is selected from the group consisting of diesel, gasoline, ethanol and blends of ethanol and gasoline.

6. The fuel apparatus of claim 1, wherein said vessel is a compressed gas cylinder.

7. The apparatus of claim 1, wherein said first conduit comprises a flexible hose.

8. The apparatus of claim 7, further comprising a sheath wrapped around said hose.

9. The apparatus of claim 1, wherein said coupling pin arrangement comprises a rotation prevention member.

10. The apparatus of claim 1, wherein said coupling pin arrangement comprises a tilt prevention member.

11. The apparatus of claim 1, wherein said vessel and said coupling pin arrangement are integrated.

12. The fuel apparatus of claim 1, said coupling pin arrangement comprising a platform comprising a top side and a bottom side, said vessel secured to said top side and said coupling pin connected with said bottom side.

13. The apparatus of claim 12, further comprising:
   (d) a coupling comprising a valve, said coupling supported by said platform; and
   (e) a second conduit connecting said coupling with said vessel;
   whereby said first conduit connects said coupling with said fuel system and said valve controlling flow of said fuel between said first conduit and said second conduit.

14. The fuel apparatus of claim 12, said fifth wheel coupling device comprising a first surface and said bottom side of said platform comprising a second surface; whereby said first surface is substantially congruent to said second surface.

15. The fuel apparatus of claim 12, said platform further comprising supports on said top side for supporting said vessel.

16. The fuel apparatus of claim 1, further comprising straps for fastening said vessel to said platform.

17. A method of fuelling a vehicle comprising:
   securing a fuel supply with a fifth wheel coupling device of said vehicle, said fuel supply primarily supported by said vehicle;
   fluidly connecting said fuel supply with a fuelling system of said vehicle; and
   communicating fuel from said fuel supply to said fuelling system for combustion in cylinders of said vehicle.

18. The method of claim 17, wherein said fuel supply comprises a cylinder, the method further comprising adapting said cylinder to engage said fifth wheel coupling device on said vehicle.

19. The method of claim 17, further comprising preventing rotation of said fuel supply.

20. The method of claim 17, further comprising preventing tilt of said fuel supply.

21. A method of fuelling a vehicle having a primary fuel supply fluidly connected to a fuelling system of said vehicle and a secondary fuel supply secured with a fifth wheel coupling device of said vehicle, said secondary fuel supply primarily supported by said vehicle and fluidly connected with said fuelling system, said method comprising:
   delivering fuel from said primary fuel supply to said fuelling system, said fueling system delivering a portion of said fuel for combustion in cylinders of said vehicle and a further portion of said fuel to said secondary fuel supply such that said secondary fuel supply is refueled with fuel from said primary fuel supply.

22. The method of claim 17, further comprising replenishing said fuel supply with fuel from a gas line.

23. The method claim 22, further comprising compressing fuel from said gas line.

24. The method of claim 17, further comprising supporting said fuel supply on a support structure when not being used by said vehicle.

25. The method of claim 24, wherein the step of securing comprises a sub-step of maneuvering said vehicle into said support structure whereby said fifth wheel coupling device engages said fuel supply; the method further comprising driving said vehicle away from said support structure.

26. The method of claim 25, further comprising:
   maneuvering said vehicle with said fuel supply into said support structure;
   supporting said fuel supply with said support structure;
   disengaging said fuel supply from said fifth wheel coupling device; and
   driving said vehicle away from said support structure.

27. The method of claim 26, wherein the step of disengaging comprises fluidly disconnecting said fuel supply from said fuelling system of said vehicle.

28. The method of claim 26, wherein the step of maneuvering comprises a prior-step of fluidly disconnecting said fuel supply from said fuelling system of said vehicle.

\* \* \* \* \*